WINDSHIELD WIPER INSTALLATION FOR AUTOMOBILES

Filed June 30, 1964 2 Sheets-Sheet 1

INVENTORS
Heinz Möller
Horst Fritze
by
Michael J. Striker
Atty

WINDSHIELD WIPER INSTALLATION FOR AUTOMOBILES

Filed June 30, 1964 2 Sheets-Sheet 2

INVENTORS
Heinz Möller
Horst Fietze
by Michael J. Striker
Attorney

United States Patent Office 3,333,174

Patented July 25, 1967

3,333,174

WINDSHIELD WIPER INSTALLATION FOR AUTOMOBILES

Heinz Möller and Horst Fietze, Stuttgart, Germany, assignors to Robert Bosch GmbH, Stuttgart, Germany Filed June 30, 1964, Ser. No. 379,167
Claims priority, application Germany, July 4, 1963, B 72,531
8 Claims. (Cl. 318—443)

The present invention relates to a windshield wiper installation for automobiles.

More particularly, the present invention relates to that type of windshield wiper installation where a driving motor which drives the windshield wipers can be optionally operated either continuously or intermittently.

In known installations of this type there is a manually operable switch capable of being placed in positions for providing continuous or intermittent operation, and when the switch is placed in the position for intermittent operation an interrupter device is connected into the circuit of the driving motor. This interrupter device is in the form of a heating coil for a temperature-sensitive switch member which opens and closes in response to heat derived from the coil so as to interrupt the motor circuit, the circuit being interrupted when a certain temperature is reached by the coil so as to open the temperature sensitive switch which closes after a certain amount of cooling so as to again close the circuit of the driving motor. Devices of this type are sensitive to variations in the potential of the source of current as well as to vibrations of the automobile, and therefore it is impossible to achieve with such constructions a constant sequence of intermittent operation where the periods of operation and non-operation can be maintained fairly constant.

It is accordingly a primary object of the present invention to provide for installation of the above type a structure which will produce intermittent operation of the windshield wipers in a manner which is substantially insensitive to potential variations as well as to vibrations of the automobile so as to guarantee a uniform duration in the periods of operation and non-operation.

It is furthermore an object of the present invention to provide a structure of the above type which is quite simple and which is extremely compact so that it requires only a small amount of space.

It is furthermore an object of the present invention to provide a structure which will be capable of maintaining the preselected sequence of operation and non-operation without requiring additional adjustments when the structure is assembled.

Furthermore, it is an object of the invention to provide a structure which will have practically no wear so that the accuracy of the intermittent operation can be reliably maintained throughout the life of the windshield wiper installation.

Still another object of the present invention is to provide an electrical assembly for accomplishing the above objects and having electrical elements which are separated from structure requiring a large amount of current, such as a driving motor, by a suitable relay which thus requires the electrical elements to be used only with relatively weak current which is required to operate the relay.

In particular it is an object of the present invention to provide for an installation of the above type an electronic interrupter assembly which is capable of providing a low impulse frequency with a short impulse duration while consuming only a small residual current during the interruptions between the impulses.

Furthermore, it is an object of the invention to provide a electronic interrupter assembly of the above type which can be adjusted so as to provide a relatively large range of interruption times between the impulses.

With the above objects in view the invention includes, in a windshield wiper installation for automobiles, an electric driving motor for driving the windshield wipers and a source of current. An electronic interrupter is also provided for the installation and a relay which includes a relay coil and a normally open switch which is closed upon energizing of the relay coil is also provided. An electrical circuit interconnects all these elements electrically, and a manually operable switch means is available to the operator and is electrically connected with the electrical circuit for optionally connecting the coil of the relay directly to the source of current so that the switch of the relay will close in order to connect the source directly to the motor for continuously driving the latter, this switch having another position where the operator can connect the coil of the relay to the source only through the electronic interrupter which periodically energizes and de-energizes the relay coil so as to periodically open and close the switch of the relay so as to provide intermittent operation of the motor which drives the windshield wipers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
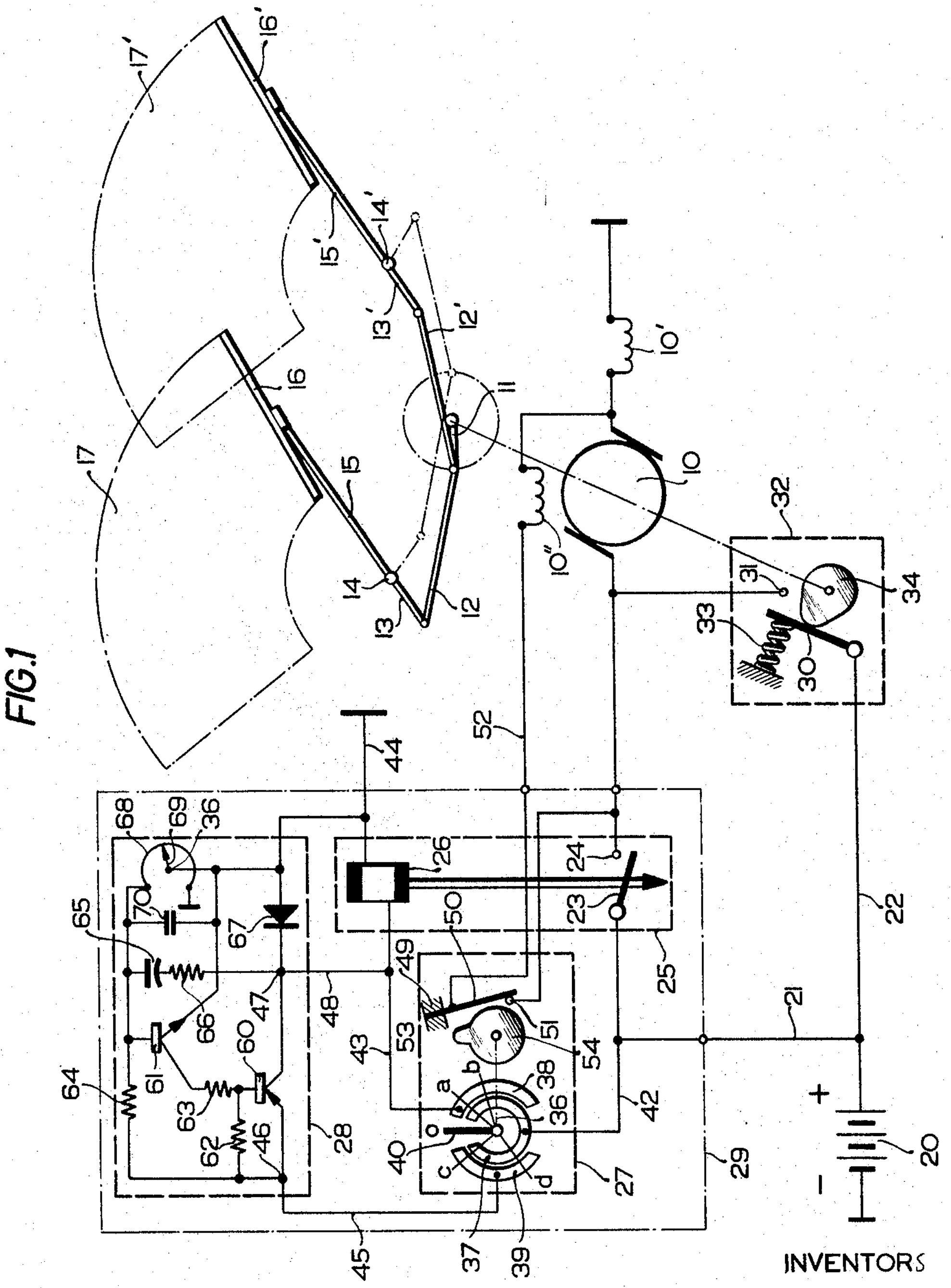
FIG. 1 is a schematic illustration of the windshield wiper installation of the invention, according to one possible embodiment thereof.

Referring now to FIG. 1, there is shown therein a direct current driving motor 10 which forms a driving motor for the windshield wipers of the installation. The drive shaft of the motor 10 fixedly carries a crank arm 11 which has a crank pin to which a pair of push-pull rods 12 and 12' are pivotally connected. The ends of these rods 12 and 12' which are distant from the crank arm 11 are pivotally connected with crank arms 13 and 13', respectively, which are supported for rotary movement on a pair of stationary shafts 14 and 14' carried by the front wall of the vehicle. These shafts also support for rotary movement the wiper arms 15 and 15' which are fixed to the crank arms 13 and 13', respectively, for swinging movement therewith and which carry the wiper blades 16 and 16' for the windshield of the vehicle. When the motor 10 operates the crank arm 11 continuously rotates and through the above-described transmission swings the wiper blades 16 and 16' through the areas 17 and 17', respectively, shown in dot-dashed lines and indicating the windshield areas which are swept through by the wiper blades.

The source of current for the motor 10 takes the form of a battery 20 which is connected through a conductor 21 as well as a conductor 22 with the armature winding of the motor and the series-connected field winding 10′ thereof. The conductor 21 is connected to the motor 10 through a normally open switch 23, 24 of a relay 25 whose coil 26 when energized closes the switch 23, 24, this coil being connected with the battery 20 either through a manually operable switch means 27 or through an electronic interrupter means 28 in the form of an impulse transmitter. The manually operable switch means 27, the interrupter means 28, and the relay means 25 are shown in FIG. 1 united into a single unit 29 indicated by the dot-dash line frame in which these assemblies are located, and the details of this unitary assembly are described below.

The conductor 22 leads from the battery through the contacts 30 and 31 of a limit switch 32 to the driving motor 10. A spring 33 acts on the movable contact 30 of the limit switch for urging the latter toward the stationary contact 31, so that the spring 33 seeks to close the switch 32. The motor 10 drives together with the crank arm 11 a cam 34 which acts on the arm 30 to displace the latter in opposition to the spring 33 away from the stationary contact 31 so as to open the switch 32 when the cam 34 turns through a predetermined angular range, and the structure is designed so that the switch 32 will be automatically opened by the cam 34 when the wiper blades 16 and 16′ are at the end positions illustrated in FIG. 1 where they are about to change their directions of movement. When the wiper blades move beyond these end positions, the continued turning of the cam 34 permits the spring 33 to close the limit switch 32 again.

The manually operable switch means 27 is in the form of a rotary switch whose contacts are concentrically arranged with respect to the rotary switch shaft 36 which is manually turned by the operator in a manner described below, and these switch contacts take the form of arcuate strips 37, 38 and 39 arranged along concentric circles whose common center is in the axis of the shaft 36, and it will be seen that the arcuate strips 38 and 39 are arranged along one circle which surrounds the circle along which the strip 37 is arranged. The switch further includes a slidable contact member 40 fixed to the shaft 36 for rotation therewith and adapted to slide along the contact strips 37–39. The contact strip 37 is connected through a conductor 42 to that part of the conductor 21 which is situated between the battery 20 and the relay 25, so that in this way the contact strip 37 is connected directly to the battery 20. The contact strip 38 is connected to a conductor 43 which is connected directly to the relay coil 26 which is in turn connected to a conductor 44 which is grounded so as to lead back to the battery through the ground connection. The contact strip 39 is electrically connected with a conductor 45 which is in turn connected to the electrical connecting point 46 of the electronic impulse transmitter 28 which forms the interrupter means of the invention, and this interrupter means 28 has an additional electrical connection point 47 connected through a conductor 48 to the coil 26 of the relay 25.

A stationary part 49 of the manually operable switch means 27 fixedly carries one end of a springy contact arm 50 which resiliently engages a stationary contact 51. The pair of contacts 50, 51 interconnect the part of the conductor 21 which is located beyond the relay switch 23, 24 through a conductor 52 with one end of a shunt winding 10″ of the motor 10, the other end of this shunt winding connected with that end of the series field winding 10′ which is connected to the armature winding of the motor. The springy contact arm 50 extends into the path of turning of a cam 53 formed by a projecting portion located at the periphery of a rotary insulating plate 54 made of an electrically non-conductive material and fixed to the shaft 36 for turning movement therewith.

The interrupter means 28 in the construction of the invention takes the form of an astable multivibrator having a pair of complementary transistors 60 and 61. The p-n-p transistor 60 is situated with its emitter connected to the connecting point 46 and with its collector connected to the electrical connection point 47 of the interrupter means. The base of the transistor 60 is connected through a coupling resistor 63 with the collector of the n-p-n transistor 61 whose emitter is connected to ground. The base of the transistor 61 is connected through a resistor 64 with the emitter of the transistor 60 and through an RC member 65, 66 with the collector of the transistor 60.

In the conductor which is connected to the collector of the transistor 60 is located the coil 26 of the relay 25. This coil is bridged by a diode 67 for conducting away the voltage peaks which are induced in the coil when it is de-energized.

The base and emitter of the transistor 61 are connected to each other through the variable resistor 68 which determines the duration of the intervals between the impulses. The resistor 68 is in the form of a carbon strip and, as further described below, has the form of a segment of a circle which is mounted together with the contact strips 37–39 of the switch means 27 on a plate of insulating material which is normal to the turnable shaft 36 of the manually operable switch means 27.

The adjustable springy contact arm 69 which engages and is shiftable along the resistor segment 68 is fixedly connected with the turnable shaft 36. The resistance of the variable resistor 68 is logarithmically distributed so that for the various angular positions of the arm 69 and the resulting increase or decrease in the durations of the pauses between impulses there can be achieved a linear variation in the changes in the durations of the intervals between the impulses. Connected in parallel with the variable resistor 68 is a small capacitor 70 which avoids disturbances in the sequence of impulses attributable to the ignition installation of the vehicle.

As is shown diagrammatically in FIG. 1, the switch 27 has a pair of positions *a* and *b* for continuous wiper operation, as well as a range of positions extending between the positions *c* and *d* at the ends of this range for providing intermittent wiper operation, and in addition there is an off position O in which the springy contact arm 40 which is connected to the shaft 36 and the springy contact arm 69 as well as the camming disc 54 assume the positions indicated in FIG. 1. In this off position of the structure which is shown in FIG. 1 the coil 26 of the relay 25 is without current and the conductor 21 leading from the battery to the motor 10 is interrupted by the open switch 23, 24 of the relay 25.

At the switch position *a*, the contact arm 40 interconnects the pair of contact strips 37 and 38 so that the current from the battery will flow through the conductors 21, 42 and 43 to the coil 26 of the relay 25 and from this coil through the ground connection back to the battery. Thus, the coil 26 will be energized so as to close the normally open switch 23, 24, and as a result current will now flow through the conductor 21 to the armature winding and to the series-connected field winding 10′ of the driving motor means 10. In the switch position *a* the springy contact member 50 remains out of engagement with the cam 53 so that current also flows through the closed switch 50, 51 and the conductor 52 to the shunt winding 10″ of the driving motor 10. The driving motor 10 therefore operates at the position *a* of the manually operable switch means with the normal speed of revolutions and without any interruptions until the switch 27 is turned to its off position, the blades 16 and 16′ then moving to their illustrated end positions where the cam 34 displaces the switch member 30 away from the contact 31 so as to open the limit switch 32 and thus interrupt the energizing of the motor 10.

In the switch position *b* of the switch 27 the contact arm 40 again interconnects the contact strips 37 and 38 with each other, so that again the current will flow to the coil 26 so as to close the normally open relay switch 23, 24 and energize the motor 10. However, in this second position for continuous wiper operation the cam 53 has engaged the springy contact arm 50 and displaced it away from the stationary contact 51 so that the shunt field winding 10′ of the driving motor is without current and therefore the exciting field of the motor has been weakened. Therefore, in the position *b* of the switch 27 the motor 10 will operate at a higher speed than in the position *a*.

At a position in the range of positions between the ends *c* and *d* of this range the contact arm 40 interconnects the contact strips 37 and 39. In this way when the operator turns the shaft 36 to place the contact 40 anywhere within the range extending between the positions *c* and *d* the base of the transistor 61 as well as the emitter thereof are connected to the full battery voltage. The transistor 61 thus becomes conductive and renders the transistor 60 also conductive through the voltage drop provided by the resistor 62. The collector current of the transistor 60 flows through the coil 26, and in this way the relay 25 is energized so as to close the normally open switch 23, 24 and the current again flows through the conductors 21 and 52 to the motor 10.

During this operating phase of the interrupter means 28 the capacitor 65 becomes charged through the low-ohm emitter-base circuit of the transistor 61 and the low-ohm emitter-collector circuit of the transistor 60, the charging of the capacitor 65 being continued up to the battery potential. When the electrode of the capacitor 65, which is electrically connected with the base of the transistor 61, has achieved the potential of the negative pole of the battery 20, the transistor 61 becomes non-conductive. The transistor 60 of course returns to its non-conductive condition with the transistor 61, so that the collector current of the transistor 60 ceases to flow, the relay 25 becomes unenergized, and the flow of current to the motor 10 is therefore interrupted.

The charging time of the capacitor 65, this time being equal to the duration of an impulse of the interrupter means 28, is so chosen that the cam 34 of the limit switch 32 has released the switch member 30 at the end of the impulse so that at this instant the switch 30, 31 is closed, and thus the driving motor 10 moves the blades 16 and 16′ back and forth through a full stroke.

At the moment when the transistors 60 and 61 return to their non-conductive condition, the potential at the capacitor 65 abruptly changes in a negative direction to an extent equal to the battery potential. The electrode of the capacitor 65 which is connected with the base of the transistor 61 discharges through the variable resistor 68 and the resistor 64. When the potential of this electrode reaches with respect to the emitter of the transistor 61 the threshold voltage of this transistor, it again becomes conductive and the operation begins again and a new cycle takes place in the above-described manner.

The interval between two such current impulses can be adjusted by the logarithmically distributed resistance 68 linearly in a range between the limits of 2 and 30 seconds, in the illustrated example. The variable resistor 68 is arranged with respect to the shaft 36 of the switch 27 in such a way that when the switch means is in the position *c* the interval of shortest duration and when the switch means is in the position *d* the interval of longest duration between successive impulses will be provided. Between the end positions *c* and *d* is the adjustable range for any desired interval between impulses between these limits.

FIGS. 2–5 of the drawings illustrate one possible structure for the switch means 27, the interrupter means 28, and the relay 25 all of which are combined together to form the unitary structure 29. This unit 29 consists essentially of a pair of assemblies 80 and 90 indicated most clearly in FIG. 5, these assemblies fitting into a substantially cup-shaped switch housing 100.

Figure 5:
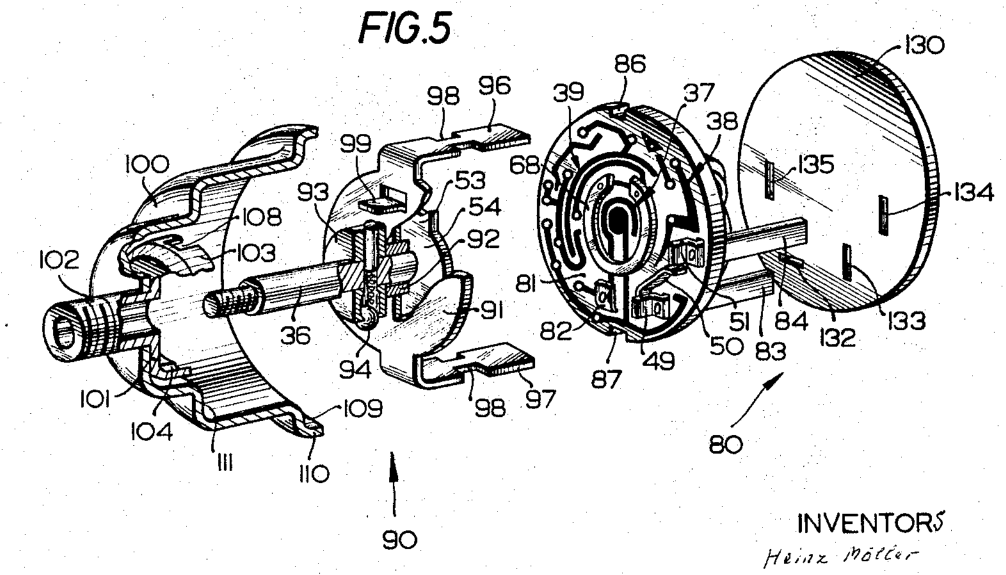
FIG. 5 is an exploded perspective illustration of the primary assemblies of the structure of the invention.

The assembly 80 includes a plate 81 of insulating, electrically non-conductive material which carries at its face which is visible in FIG. 5 the contact strips 37–39 of the switch means 27 and conductors of the interrupter means 28, which may be mounted on the plate 81 in the form of a printed circuit or in the form of electrically conductive layers mounted on the plate by vapor deposition, and in addition this same face of the plate 81 carries the resistor 68 in the form of a layer of carbon extending along an arc of a circle. The other face of the insulating plate 81, which is not visible in FIG. 5, carries the remaining elements of the interrupter means 28 and also carries the relay 25, as well as the electrical connector strips 82–85. The ends of the connector strips 82–84 extend through the insulating plate 81 and are riveted to the front face thereof. The bent front end of the strip 83 acts as the electrical connection point 49 for the springy contact arm 50 whose stationary contact 51 is formed by the bent front end of the connector strip 84. The insulating plate 81 has a pair of rectangular notches 86 and 87 formed in diametrically opposed peripheral portions of the plate 81.

Figure 2:
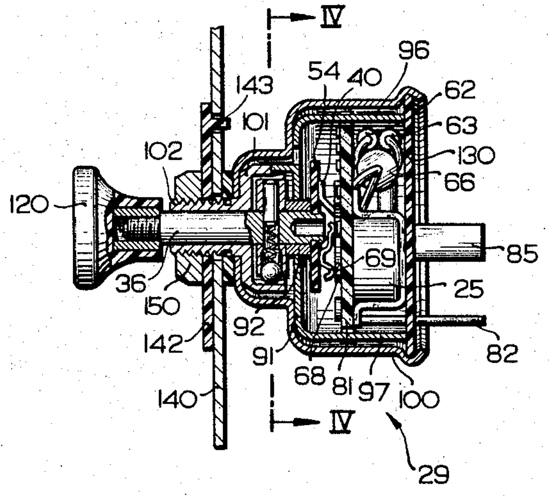
FIG. 2 is a longitudinal sectional view of the installation of the invention shown mounted on a dashboard of a vehicle.
Figure 3:
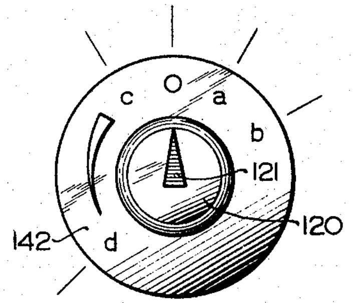
FIG. 3 is a front view of the structure as it appears from the front of the dashboard.
Figure 4:
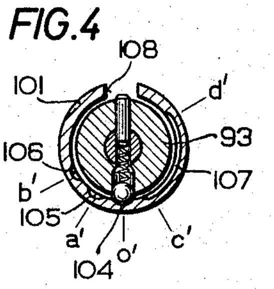
FIG. 4 is a transverse sectional view taken along line IV—IV of FIG. 2 in the direction of the arrows and showing structure for releasably maintaining the switch means of the invention in any selected one of a plurality of different positions.

The assembly 90 includes the carrier plate 91 which fixedly carries the bearing sleeve 92 in which the shaft 36 of the switch means 27 is supported for turning movement. The end of the shaft 36 which is directed toward the assembly 80 carries the plate 54 which is provided with the camming projection 53 which actuates the switch member 50 in the above-described manner. This plate 54 also carries the springy contact arms 40 and 69 (FIG. 2). A ring 93 surrounds and is carried by the shaft 36, and this ring or annular body 93 is fixedly pinned to the shaft 36 so as to be movable therewith, and the ring 93 together with the plate 54 prevent axial movement of the shaft 36 with respect to the plate 91, the elements 93 and 54 being fixed to the shaft 36 and engaging opposed ends of the bearing sleeve 92 which is fixed to the plate 91, so that in this way the shaft 36 can only turn about its axis. The body 93 is formed with a radial bore which houses a coil spring which presses against a ball 94 so as to urge the latter outwardly away from the shaft 36, and the open end of the radial bore is slightly constricted so that while the ball 94 can extend outwardly beyond the periphery of the ring 93 it cannot fall out of the radial bore thereof.

The plate 91 carries at diametrically opposed portions a pair of extensions 96 and 97, respectively, and these extensions extend parallel to each other at right angles to the plane of the plate 91. The distance between the faces of the extensions 96 and 97 which are directed toward each other corresponds to the distance between the innermost surfaces of the notches 86 and 87. Each of the extensions 96 and 97 is formed with a pair of opposed rectangular notches 98 which have dimensions longitudinally of the extensions equal to the thickness of the plate 81. Furthermore, a tongue 99 is struck from the plate 91 and extends forwardly therefrom.

The housing 100 carries at its closed end a bearing sleeve 101 for the shaft 36. This bearing sleeve 101 has a threaded extension 102 extending forwardly beyond the housing 100 through an opening in the central wall portion thereof, and within the housing 100 the sleeve 101 has a cup-shaped portion provided with a rim 103. The cylindrical inner surface of the rim 103 is formed with recesses 104, 105, 106 situated at the positions *o′*, *a′*, and *b′*, as shown most clearly in FIG. 4, and in addition the rim 103 is formed in its interior with an elongated circumferentially extending recess 107 the ends of which have the positions *c′* and *d′* indicated in FIG. 4. Thus, these recesses form with the spring-pressed ball 94 a detent structure for releasably holding the switch means in the positions *a–d* referred to above. The recess 104, when it receives the ball 94, positions the switch in the off position O. Directly opposed to the recess 104 the ring 93 is formed with a peripheral cutout 108 the width of which corresponds to the width of the tongue 99 of the plate 91, and when the parts are assembled the tongue 99 is received in the cutout 108. The periphery of the housing 100 at its open end is provided with an annular shoulder 109 which is joined to a peripheral rim 110. Between its central wall portion and the shoulder 109 the housing 100 has an additional shoulder 111.

The switch means further includes a handle 120 threaded onto the front end of the shaft 36 and also a closure plate 130 capable of being inserted into the open end of the housing 100. The handle 120 carries an index 121 (FIG. 3) in the form of an arrow pointing toward the periphery of the handle. The diameter of the closure plate 130 corresponds to the inner diameter of the rim 110 of the housing 100. The closure plate 130 is formed with slots 132–135 through which the connector strips 82–85 extend so that through these strips the electrical connections to the remaining structure can be made.

When the above-described structure of FIGS. 2–5 is assembled, the assembly 90 is placed on the assembly 80 until the notches 98 of the extensions 96 and 97 receive the peripheral portions of the plate 81 immediately adjacent to and defining the limits of the notches 86 and 87, the portions of the extensions 96 and 97 which are situated between their notches 98 snapping into the notches 86 and 87 of the plate 81 so that in this way the assembly 90 is connected with the assembly 80. With this construction the insulating plate 81 is fixed in a non-shiftable and non-rotatable manner with respect to the plate 91 so that it has with respect to the plate 91 a predetermined position in which the springy contact arms 40 and 69 engage the contact strips 37–39, on the one hand, and the resistor segment 68, on the other hand, with the desired contact pressure. The connected assemblies 80 and 90 are then inserted into the housing 100 until the carrier plate 91 engages the inner surface of the shoulder 111 of the housing 100. The entry of the tongue 99 into the notch 108 at this time guarantees an accurate angular position of the parts with respect to each other. The body 93 extends into the space surrounded by the rim 103 of the cup-shaped interior portion of the bearing sleeve 101, and the shaft 36 extends at its front threaded end forwardly beyond the bearing sleeve 101. The ball 94 in the body 93 thus forms with the recesses 104–107 a releasable detent structure for releasably holding the shaft 36 in a selected one of the above positions as well as at any selected location between the end positions *c–d*.

The closure plate 130 is moved into the space surrounded by the rim 110 in such a way that the connector strips 82–85 respectively pass through the several slots 132–135 of the plate 130, as is apparent from FIG. 2, the closure plate 130 when fully inserted engaging the shoulder 109 and also engaging the relay 25 so as to provide a very secure mounting for the relay. The edge of the rim 110 is then spun inwardly so as to have a smaller diameter than the outer periphery of the closure plate 130, as is apparent from FIG. 2, and in this way all of the components are retained in the assembled condition shown in FIG. 2.

As may be seen from FIG. 2, dashboard 140 of the vehicle is formed with an opening through which the threaded extension 102 of the sleeve 101 is displaced in order to mount the structure on the dashboard, and at the same time this extension 102 is displaced through the central opening of an indicating disc 142 which has its angular position determined by a projection 143 on the rear face of the disc 142 which extends through a second opening of the dashboard 140. Now a nut 150 is loosely threaded onto the threaded extension 102 which projects forwardly beyond the disc 142, and the handle 120 is fixedly threaded onto the forwardly projecting front end of the shaft 36. At this time the switch has been placed by the operator in a known position and with the nut 150 loosely on the threaded portion 102 of the bearing 101 the entire assembly is turned until the index 121 is aligned with that one of the indicia of the disc 142 (shown in FIG. 3) which corresponds to the known position in which the switch means has been placed by the operator, and with the index 121 thus aligned with the proper one of the indicia of the disc 142 the operator tightens the nut 150, so that in this way the entire assembly is properly positioned so that when the knob 120 is thereafter turned the positions can be selected by aligning the index 121 with a selected one of the several position-indicating indicia provided at the front face of the disc 142.

It will be understood that each of the elements described above, or two or more together, may also find a useful application in other types of windshield wipers differing from the types described above.

While the invention has been illustrated and described as embodied in windshield wiper controls, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a windshield wiper installation for automobiles, in combination, electric motor means for driving windshield wipers; a source of current; relay means including a coil and a normally open switch; manually operable switch means; electronic interrupter means including an astable multivibrator having a pair of complementary transistors interconnected by an R–C network; and electric circuit means interconnecting said motor means, source of current, relay means, switch means, and interrupter means, said manually operable switch means having one position connecting said coil of said relay means directly to said source of current for closing said normally open relay switch to provide continuous energizing of said electric motor for continuous operation of the windship wiper and said switch means having a second position connecting said coil of said relay means to said source through said electronic interrupter means for providing intermittent operation of said motor means.

2. In a windshield wiper installation for automobiles, in combination, electric motor means for driving the windshild wipers; a source of current; an astable multivibrator having a pair of complementary transistors interconnected with an R–C network; circuit means electrically interconnecting said source, said motor means, and said multivibrator; and manually operable switch means electrically connected with said circuit means for placing the latter either in a position connecting said motor means directly to said source to provide continuous operation of the windshield wipers or connecting said motor means to said source through said multivibrator for providing intermittent operation of said motor means.

3. In an installation as recited in claim 2, said multivibrator including a variable resistor connected in parallel with an emitter-base circuit of one of said transistors, said multivibrator including an RC network for determining the periodic intervals of operation of said motor means, and said RC member being electrically connected with the base of said latter transistor.

4. In an installation as recited in claim 3, said variable resistor having a logarithmically distributed resistance.

5. In a windshield wiper installation, in combination, electric driving motor means for driving the windshield wipers; a source of current; electronic interrupter means including an astable multivibrator having a pair of complementary transistors interconnected by an R–C network, and including a variable resistor; electrical circuit means for interconnecting said motor means, said source and said interrupter means; and manually operable switch means connected with said circuit means and having a pair of positions for optionally connecting said motor means to said source for continuous operation of said motor means or for connecting said motor means to said interrupter means and said interrupter means to said source for providing intermittent operation of said motor means, said manually operable switch means including a manually turnable shaft carrying a contact which is turnable with said shaft and electrically conductive strips arranged along concentric circles whose common center is in the axis of said shaft, said strips being engaged by said contact, and said variable resistor including a carbon contact strip arranged along a circle concentric with said shaft.

6. In an installation as recited in claim 5, said variable resistor also including a movable contact member engaging said carbon contact strip and fixed to said shaft for rotary movement therewith.

7. In a windshield wiper installation, in combination, electric driving motor means for driving the windshield wipers; a source of current; a relay having a relay coil and a normally open switch which is closed when said coil is energized; an electric circuit including said motor means, said source, and said relay for energizing said motor when said normally open switch is closed upon energizing of said relay coil; electronic interrupter means including an astable multivibrator having a pair of complementary transistors interconnected by an R–C network, said interrupter means being adapted to be connected electrically with said relay coil; and manually operable switch means connected to said circuit for connecting said relay coil directly to said source for continuously operating said motor means through said relay switch or for connecting said relay coil to said source through said interrupter means for intermittently closing and opening said relay switch to provide intermittent operation of said motor means, said manually operable switch means including a manually turnable rotary shaft, an insulating plate normal to said shaft and carrying on one of its faces a plurality of concentric contact strips arranged along concentric circles whose center is in the axis of said shaft and forming part of said manually operable switch means, said face of said insulating plate also carrying a variable resistor and conductors of said interrupter means, and the opposite face of said insulating plate carrying said relay means and the remaining elements of said interrupter means as well as electrical connection elements for said switch means.

8. In an installation as recited in claim 7, said manually operable switch means including an outer housing and a pair of assemblies carried by said housing in the interior thereof, one of said assemblies including a support plate having a bearing for said shaft and carrying means for preventing axial movement of said shaft, and the other of said assemblies including said insulating plate and the contact strips, conductors, interrupter means and relay carried thereby.

References Cited

UNITED STATES PATENTS

| | | | |
|---|---|---|---|
| 3,219,901 | 11/1965 | Foreman et al. | 318—443 |
| 3,262,042 | 7/1966 | Amos | 318—443 |

ORIS L. RADER, *Primary Examiner.*

BENJAMIN DOBECK, *Examiner.*

J. C. BERENZWEIG, J. J. BAKER, *Assistant Examiners.*